No. 826,505. PATENTED JULY 17, 1906.
C. H. HENZEL.
STRAINER.
APPLICATION FILED JUNE 27, 1905.
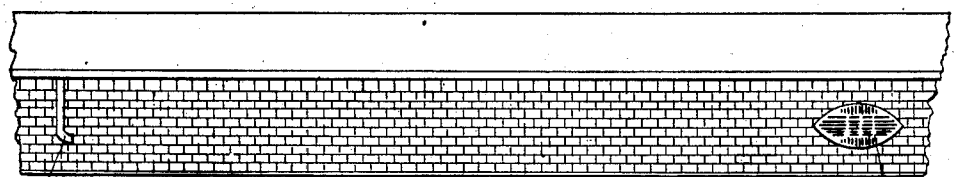
Fig. 1.
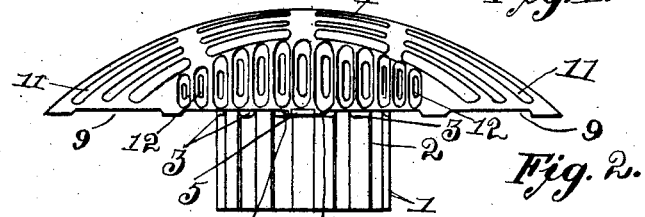
Fig. 2.
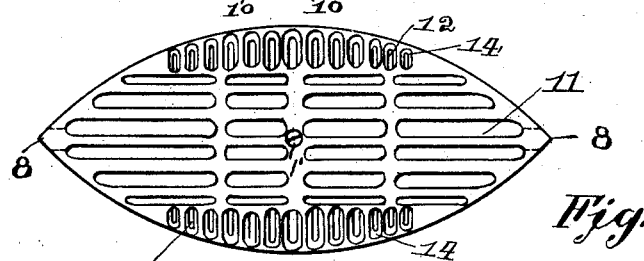
Fig. 3.
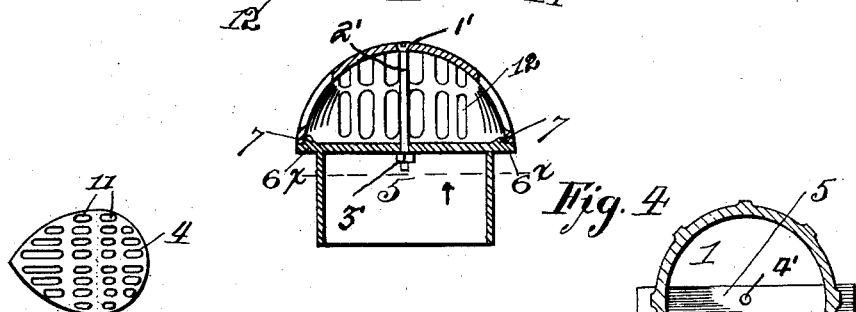
Fig. 4.
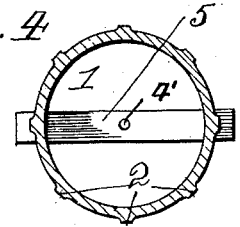
Fig. 8.
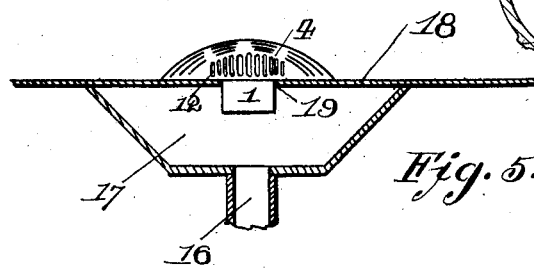
Fig. 5.
Fig. 7.
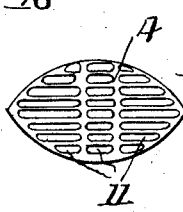
Fig. 6
Witnesses.
C. A. Rudolph
H. H. Butler
Inventor
Casper H. Henzel
By N. C. Evert & Co.
Attorneys

UNITED STATES PATENT OFFICE.

CASPER H. HENZEL, OF ALLEGHENY, PENNSYLVANIA, ASSIGNOR OF ONE-THIRD TO R. J. BROWN, OF ALLEGHENY, PENNSYLVANIA, AND ONE-THIRD TO JOHN G. FITZPATRICK, OF WILKINSBURG, PENNSYLVANIA.

STRAINER.

No. 826,505.　　　　Specification of Letters Patent.　　　　Patented July 17, 1906.

Application filed June 27, 1905. Serial No. 267,313.

*To all whom it may concern:*

Be it known that I, CASPER H. HENZEL, a citizen of the United States of America, residing at Allegheny, in the county of Allegheny and State of Pennsylvania, have invented certain new and useful Improvements in Strainers, of which the following is a specification, reference being had therein to the accompanying drawings.

This invention relates to certain new and useful improvements in gutter stops and strainers; and the primary object of the invention is to provide a shield or screen for gutter-outlets, which will prevent paper, sticks, and the like debris from entering the outlet and clogging the same.

Another object of the invention is to provide a shield or screen for water-outlets which will serve functionally as a trap and prevent solid matter from entering the outlet and retarding the movement of water therethrough.

My improved shield or strainer is particularly adapted to be used in connection with gutters in saloons, cafés, and such places where a gutter is provided for expectorating purposes. It is the common practice to permit a stream of water to flow in the gutter to remove the ingredients that may adhere to the same, these ingredients being carried to the water-outlet. Considerable trouble has been experienced by the outlets becoming clogged by paper, matches, cigars, and such foreign matter as is generally deposited in the gutters.

My invention primarily aims to provide positive and reliable means for preventing the above-mentioned foreign matter from entering the water-outlet; also, to remove such foreign matter from the entrance of the outlet, whereby it cannot form an obstruction to the water, which would cause the same to "back up" and overflow the gutter.

With the above and other objects in view the invention consists in the novel construction, combination, and arrangement of parts, which will be hereinafter more fully described and then specifically pointed out in the claims, and referring to the drawings accompanying this application like numerals of reference designate corresponding parts throughout the several views, in which—

Figure 1 is a fragmentary top plan view of a gutter equipped with my improved shield or strainer. Fig. 2 is a side elevation of the strainer. Fig. 3 is a top plan view. Fig. 4 is a transverse sectional view. Fig. 5 is a longitudinal sectional view of a gutter-outlet equipped with my improved strainer, the outlet being considerably larger than the strainer. Fig. 6 is a top plan view of a strainer stamped from a piece of sheet metal. Fig. 7 is a modified form of strainer; and Fig. 8 is a sectional view taken on the line $x\ x$ of Fig. 4, illustrating a collar employed in connection with the strainer.

To put my invention into practice, I employ a collar 1, which forms a foundation for my improved shield or strainer, this collar being adapted to be placed in the outlet of a gutter. The collar is formed with raised vertically-disposed ribs 2, the material lying between the upper ends of these ribs being cut away, as indicated at 3, to permit of water entering the collar beneath my improved shield or strainer 4. To strengthen the collar 1 and at the same time support the shield or strainer, I have arranged transversely of the top of the collar a bar 5, the ends of which extend beyond the sides of the collar, as indicated at 6 6. The top surfaces of the ends of the bar 5 are provided with lugs 7 7, adapted to engage the inner walls of the shield or strainer 4, as clearly illustrated in Fig. 4 of the drawings.

To retain the shield 4 upon the collar 1, I provide the shield with a beveled aperture 1' and the bar 5 with an aperture 4'. A screwbolt 2' is placed in these apertures, and a nut 3' employed to retain the bolt 2' therein. In this manner the two parts of the strainer are secured together.

The shield or strainer 4 in top plan view is substantially elliptical and in cross-section substantially semicircular, the radii of its different diameters decreasing from its center to its ends, which terminate in points 8 8. The bottom edge of the shield or strainer is cut away at a plurality of places, as indicated at 9, to permit of water passing under the strainer. When cutting away the lower edges of the strainer, I provide two depending lugs 10 10 upon each side of the strainer, these lugs being adapted to embrace the ends 6 6 of the bar 5. The strainer is provided with a plurality of elongated openings or apertures 11, these openings being arranged longitudinally of the strainer, preferably over the top surface of the same. The sides of the strainer are provided with a plurality of elongated openings 12, the longitudinal axis of said openings conforming to the curvature or periphery of the shield or strainer. In forming these openings I preferably provide the same with tapering sides 14 14, this construction being employed whereby water may easily enter the openings, the entrance side of said openings being larger than the discharge side thereof.

When my improved shield or strainer for gutters is to be used, I mount the same longitudinally of the gutter, as clearly illustrated in Fig. 1 of the drawings—that is, the points 8 lying in the bottom of the gutter and in alinement with the flow of water within said gutter. In Fig. 1 of the drawings I have illustrated a gutter as having a water-inlet pipe 14', adapted to feed water to the gutter, and as these gutters are generally constructed upon a slight inclination the water is adapted to flow down the gutter to the outlet-point 15. The flow of water in these gutters is generally sufficient to carry off the matter that may be deposited in the gutter, and by observing the position of my improved shield or strainer within the gutter it will be seen that the outlet is fully covered by the strainer, and should any foreign matter, as matches, be washed downwardly to the outlet it will be carried to one side of the shield or strainer and prevented from clogging the entrance of water to the outlet.

I am well aware of strainers or screens being devised to prevent solid substances from entering an outlet; but to the best of my knowledge a strainer has never been devised capable of removing foreign matter from the outlet without clogging the same.

In Fig. 5 of the drawings I have illustrated a gutter-outlet 16, which is provided with a well 17 of a conventional form. Where gutters are constructed, I may employ a metallic plate 18, having an opening 19 formed therein to receive my improved shield or strainer, this construction simply being employed in connection with gutters where the discharge-openings are provided with wells employed for accumulating whatever foreign matter that may be carried to the outlet.

I preferably construct my improved shield or strainer of aluminium or brass, and it is obvious that various other metals may be employed which will serve the same purposes.

In Fig. 6 of the drawings I have illustrated a strainer or shield which is stamped from sheet metal, it being observed that all the openings of the strainer are arranged longitudinally of the strainer.

Fig. 7 illustrates a strainer having a circular rounded end, this form being used in different positions where it is impossible to use the elliptical form. Sometimes the gutter-outlet is very close to a wall, in which instance I employ the form shown in Fig. 7.

It is thought from the foregoing that the construction, operation, and advantages of the herein-described gutter stop and strainer will be apparent without further description, and various changes in the form, proportion, and minor details of construction may be resorted to without departing from the spirit of the invention or sacrificing any of the advantages thereof.

What I claim, and desire to secure by Letters Patent, is—

1. A strainer or trap of the character described consisting of a collar, having vertically-disposed ribs formed thereon, a transversely-disposed bar carried by said collar, a substantially elliptical-shaped strainer supported by the ends of said bar, said strainer having elongated openings formed therein, substantially as described.

2. A strainer or trap of the character described consisting of a collar having vertically-disposed ribs formed thereon, a substantially elliptical-shaped removable strainer carried by said collar, said strainer having openings formed therein, substantially as described.

3. A strainer or trap of the character described, consisting of a collar adapted to fit within a gutter-outlet, said collar being formed with vertically-disposed ribs, a strainer of concavo-convex form, said strainer being of larger diameter than said collar, and means for removably attaching the strainer to the collar.

4. A strainer or trap of the character described, consisting of a collar adapted to fit within a gutter-outlet, said collar being provided with vertical passages in its outer surface, a strainer of concavo-convex form having openings in its walls and having portions of its lower edge cut away, said strainer being of larger diameter than said collar, and means for connecting the strainer to the collar.

In testimony whereof I affix my signature in the presence of two witnesses.

CASPER H. HENZEL.

Witnesses:
K. H. BUTLER,
E. E. POTTER.